US009871896B2

(12) United States Patent
Sorondo

(10) Patent No.: US 9,871,896 B2
(45) Date of Patent: Jan. 16, 2018

(54) CELLULAR PHONE IN A BODY OF A HOME/OFFICE TELEPHONE

(76) Inventor: Miriam Gema Sorondo, Miami, FL (US)

( * ) Notice: Subject to any disclaimer, the term of this patent is extended or adjusted under 35 U.S.C. 154(b) by 273 days.

(21) Appl. No.: 13/261,685

(22) PCT Filed: Apr. 18, 2011

(86) PCT No.: PCT/US2011/000691
§ 371 (c)(1),
(2), (4) Date: Nov. 4, 2013

(87) PCT Pub. No.: WO2012/091729
PCT Pub. Date: Jul. 5, 2012

(65) Prior Publication Data
US 2014/0066137 A1 Mar. 6, 2014

(51) Int. Cl.
*H04M 1/02* (2006.01)
*H04W 88/06* (2009.01)
*H04M 1/725* (2006.01)

(52) U.S. Cl.
CPC ......... *H04M 1/0202* (2013.01); *H04W 88/06* (2013.01); *H04M 1/72502* (2013.01); *H04M 2250/06* (2013.01)

(58) Field of Classification Search
CPC ........... H04M 1/0202; H04M 1/72502; H04M 2250/06; H04W 88/06; H04W 84/105; H04W 88/02; H04B 1/3877; H04B 7/18563; H04B 7/18571; H04H 40/90
See application file for complete search history.

(56) References Cited

U.S. PATENT DOCUMENTS

| | | | | |
|---|---|---|---|---|
| 6,072,768 | A * | 6/2000 | Wiedeman | H04B 7/18563 340/7.25 |
| 6,501,939 | B1 * | 12/2002 | Dent | H04B 1/3877 331/2 |
| 7,110,789 | B1 * | 9/2006 | Curtiss et al. | 455/556.1 |
| 7,142,885 | B2 * | 11/2006 | Underwood | 455/556.1 |
| 8,359,416 | B1 * | 1/2013 | Zhang | G06F 13/4022 710/313 |
| 8,412,291 | B2 * | 4/2013 | Harrison | H04M 1/0274 343/702 |
| 8,619,989 | B2 * | 12/2013 | Thermond | 380/275 |
| 2005/0070272 | A1 * | 3/2005 | Marangos | 455/426.2 |
| 2005/0153732 | A1 * | 7/2005 | Stotelmyer | H04W 88/06 455/552.1 |
| 2005/0266887 | A1 * | 12/2005 | Elmenayer | H04M 1/02 455/561 |

(Continued)

*Primary Examiner* — Habte Mered

(57) ABSTRACT

This invention is a telephone station for placement in the home or work environment which can send and receive telephone calls over CDMA & GSM communication bands and direct link satellite communication such as Iridium, Globalstar and other similar systems. By using both antennas inside the cellular handset and a CPU/Switching Hardware with a 3 channel switching device this product can work on every cellular market on earth. A cellular signal range extender is included to improve signal strength for areas with poor coverage. In addition, the inclusion of an internet router built-in to the base station will permit this device to connect to internet telephony services. To extend the functionality of this phone; we can embed a WiFi wireless internet.

10 Claims, 4 Drawing Sheets

PHONE BLOCK DIAGRAM

(56) References Cited

U.S. PATENT DOCUMENTS

Figure 1:
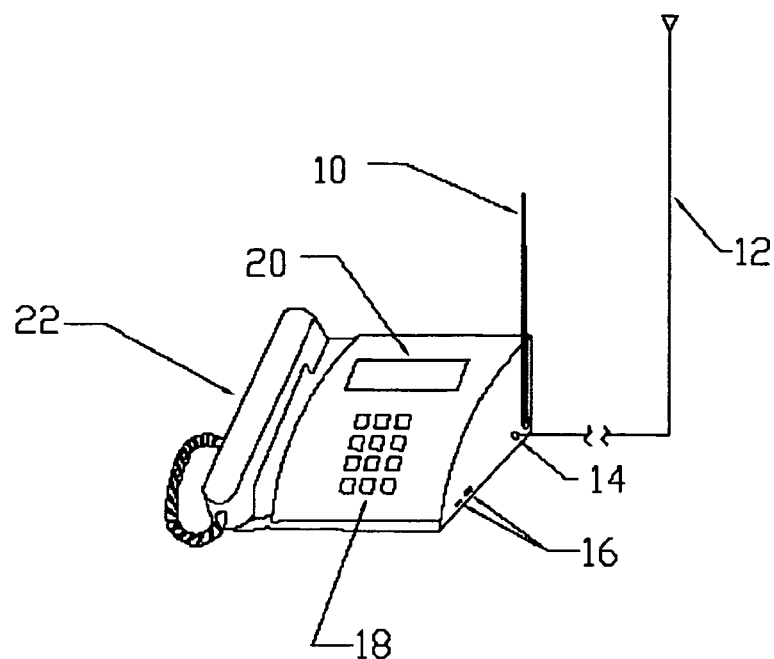
Figure 1:
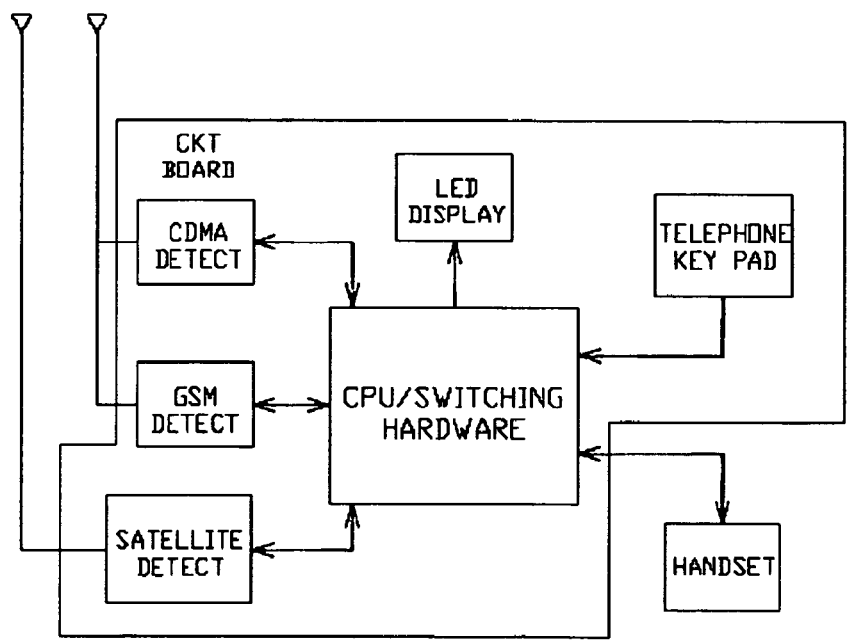

| | | | | |
|---|---|---|---|---|
| 2005/0282492 A1* | 12/2005 | Lopez | ............. | H04W 84/14 |
| | | | | 455/12.1 |
| 2005/0286476 A1* | 12/2005 | Crosswy | ............. | H04W 88/10 |
| | | | | 370/338 |
| 2006/0293038 A1* | 12/2006 | Walter et al. | ............. | 455/418 |
| 2007/0032246 A1* | 2/2007 | Feher | ............. | H04W 64/00 |
| | | | | 455/456.1 |
| 2008/0207200 A1* | 8/2008 | Fein et al. | ............. | 455/426.1 |
| 2009/0318185 A1* | 12/2009 | Lee | ............. | 455/550.1 |

* cited by examiner

PHONE BLOCK DIAGRAM

CELLULAR PHONE IN A BODY OF A HOME/OFFICE TELEPHONE

CROSS-REFERENCE TO RELATED APPLICATIONS

This application claims continuation of U.S. Utility application Ser. No. 12/930,133 having a filing date of Dec. 29, 2010, the, entire contents of which are hereby incorporated by reference.

FEDERALLY SPONSORED RESEARCH

Not Applicable

SEQUENCE LISTING OR PROGRAM

Not Applicable

BACKGROUND

Field of Invention

This current invention is directed to a telephone station for placement in the home or work environment which can send and receive calls and data through a cellular network and/or through satellite communication means. More specifically the telephone set includes high gain antennas that allow reception of telephone signals through cellular and satellite means of communication and a CPU/Switching Hardware with 3 channel selectivity capable of detecting the existing different wireless protocols in use; determine what mode of operation will be the most convenient and then open a channel of communication through the appropriate or selected carrier.

Prior Art

Generally home/office telephones operate with a terrestrial physical connection (plain old telephone system). Home and Office telephone services are insolated to a single geographic landline connection which in certain areas connecting landlines can be cumbersome and expensive.

From Patentability Search it has been found: The Curtiss et. al. Invention with U.S. Pat. No. 7,110,789 Issued on Sep. 19, 2006.

The Curtiss Reference entitled "Wireless Communication Device Docking System and Method" relates to a docking system and method for a wireless communication device. That system requires a docking station where a wireless communication device can be docked to a base station for communications. The Docked System appears to be a traditional telephone set.

Basically the switching characteristics of the Curtiss phone are:

a) terrestrial phone is attached to device.
b) interior switching detects cell phone in docking station.
  4.—The Curtiss system requires a matched pair system where the docking station and phone have to be compatible which renders it not marketable because of the different number of cell phone configurations currently in place. The present invented telephone set, by being a self contained cell phone in the body of a home/office, does not have such limitations.

The differences between the present invented Desktop home and office Phone and the Curtiss Phone System are as follows:

1.—No POTS (plain old telephone system). No terrestrial physical connection for traditional telephone service.

2.—The present invention does not require no docking and acts as a regular cell phone with a large screen and a handset for convenient use by consumer.

3.—The present invention, by being a self contained cell phone, in a body of a traditional telephone set, does not have limitations.

5.—Therefore the present invention of a cellular phone technology in a body of a home/office telephone alleviates to great extend the disadvantages of the known home and office telephone apparatus by being a self contained device equipped to send and receive telephone calls via cellular network and satellite communication systems.

DETAILED DESCRIPTION AND SYNOPSIS OF OPERATION OF THIS INVENTION

This current invention can be described as a missing link in the voice communication field. This system bridges the gap between the portability of a cell phone and the functionality of a desktop use. A regular cell phone lacks the capacity of being used with an exterior keyboard and screen, whereas this device with the use of USB ports can be used as a full computer by installing exterior keyboards, screens and any other device.

Desktop Cellular Phone is a self contained communication device capable of transmitting voice and data over the following communication bands:

1.—CDMA-Solely used in the United States by cell phone providers such as Verizon, AT&T, Sprint, etc.

2.—GSM-used through the world in Europe, Asia, Africa and limited use in the United States.

3.—Direct link satellite communication such as Iridium and other similar system.

The current invention will also have WiFi capabilities.

The incorporated CPU/Switching Hardware will be a 3 channel switching device capable of detecting the existing different wireless protocols to use. This switch will connect the Desktop Phone to any of the three systems mentioned above.

Besides detecting the different type signals, through the use of auxiliary antennas, the CPU will determine what mode of operation will be the most convenient and then open a channel of communications through the appropriate carrier. This approach will be on a modular basis.

If the subscriber chooses to have all three modes of communications then the switch will select automatically which channel is the most appropriate for the area. Also the desktop telephone will be modular in that it could be sold as a basic CDMA system with upgradeable use functions such as GSM and satellite. By using both antennas this product can work on every cellular market on earth.

The Desktop unit will be powered by regular home electricity and will have a battery back-up power unit for use in remote areas or during power failure conditions.

The handset will be the main channel of voice transmission and the unit has 2 USB ports for connection to exterior devices such as keyboard/mouse configuration for additional communications such as text and e-mail messages.

The Desktop has no POTS (plain old telephone system). No terrestrial physical connection for traditional telephone service and does not need a docking station. This new Desktop device will be portable by operating with all the existing different wireless protocols in use. The current invented phone, by being a self contained cell phone does not have limitation, and is also totally mobile.

The Desktop system requires no docking and acts as a regular cell phone with a large screen and handset for convenient use by consumer. The handset can be either cord type or cordless.

SPECIFICATIONS

This invention alleviates to great extend the disadvantages of the known home and office telephone apparatus for using wireless communication systems. The cellular handset can utilize both GSM and CDMA radio interface technologies for compatibility with all major cellular carriers. GSM (Global System for Mobile Communications) is the most popular standard for mobile telephony systems in the world. The GSM Association estimates that 80% of the global mobile market uses the standard. GSM is used by over 1.5 billion people across more than 212 countries. The CDMA Development Group states that, as of November 2009, there are 308 operators in 116 countries offering CDMA2000 1× and 1×EV-DO services. For maximum compatibility with future 4 G communications, the LTE CDMA standard should be utilized—depending on costs. By using both antennas inside the cellular handset, we have a product that can work on every cellular market on earth.

In addition, for customers operating in areas with poor cellular signal coverage, a cellular signal range extender will be included in the cellular base station device. A Dual-Band extender antenna will work with all carriers in the United States. Otherwise, multiple antennas would be needed because the 800 Mhz model works with AT&T, Verizon and Alltel cellular wireless phones in the frequency range of 824-894 MHz. The 1990 Mhz model works with T-Mobile, Metro PCS, Cricket, Suncom, and Sprint (not Nextel) PCS wireless phones in frequency range of 1850-1990 MHz.

Typically, a signal extender can improve signal strength from 50-60 dB at a power output of less than 0.5 Watt equivalent isotropically radiated power (EiRP) with the included antenna.

To further extend the functionality of this cellular base station device, the inclusion of a internet router, built-in to the base station, will permit this device to connect to internet telephony services. The cellular handset's WiFi will comply with the IEEE 802.11 standards for wireless local area network (WLAN) computer communication in the 2.4, 3.6 and 5 GHz frequency bands. The most popular variations are those defined by the 802.11b and 802.11g protocols, which are amendments to the original standard. The 802.11b and 802.11g standards use the 2.4 GHz ISM band, operating in the United States under Part 15 of the US Federal Communications Commission Rules and Regulations. The used segment of the radio frequency spectrum varies between countries. In the US, 802.11a and 802.11g devices may be operated without a license, as allowed in Part 15 of the FCC Rules and Regulations. Frequencies used by channels one through six (802.11b) fall within the 2.4 GHz amateur radio band. Licensed amateur radio operators may operate 802.11b/g devices under Part 97 of the FCC Rules and Regulations, allowing increased power output but not commercial content or encryption.

To extend the functionality of this phone, we can embed a standard 802.11b/g WiFi wireless internet hotspot antenna for sharing of the internet connection with other WiFi enabled devices. Logically, additional cellular handset phones can connect to the same Internet telephony services via the primary cellular handset on the premises.

To be more specific, the unique Desktop telephone design consists of a CPU/Switching Hardware with a 3 channel device capable of detecting the existing different wireless protocols in use. This switch will connect the invented Desktop Phone to any of the three systems mentioned above. Besides detecting the different type signals, through the use of auxiliary antennas, the CPU will determine what mode of operation will be the most convenient and then open a channel of communications through the appropriate carrier. This approach will be on a modular basis. If the subscriber chooses to have all three modes of communications then the switch will select automatically which channel is the most appropriate for the area. Also, the invented Desktop will be modular in that it could be sold as a basic CDMA system with upgradeable use functions such as GSM and satellite. The CHOTS system with its use of USB ports can be used as a full computer by installing exterior keyboards, screens and any other devices.

SUMMARY

According with the description of my invention cited in the context of this application this "Cellular Phone in a Body of a Home/Office Telephone" should be understood that, it refers to a telephone station which can send and receive telephone calls and data through cellular and satellite communication means and not through a traditional landline connection.

More specifically this telephone station includes high gain antennas that allow reception of telephone signals through the existing different wireless protocols in use. Therefore, the present invention alleviates to great extend the disadvantages of the known existing home and office telephone apparatus limitations by being equipped to use wireless communication signals.

Advantages

The invented Desktop Cellular Phone can be described as a missing link in the voice communications field. This system fills the gap between the portability of a cell phone and the functionality of desktop use.

This invention alleviates to great extend the disadvantages of the known existing home and office telephone apparatus limitations for using wireless communication systems.

With the incredible explosion in new cellular telephone technology, there is a growing market segment that has opted out of traditional telephone services. Since cellular telephones are so convenient and portable, it makes little sense to also have home telephone wireless services since they are isolated to a single geographic landline connection and in certain areas connecting land lines can be cumbersome and expensive.

However, cellular telephones are offering increasingly complex services which are not applicable to a large consumer segment, specifically the graying population of the world. These additional services are less relevant to the aging population who has little need for Internet, email, video, apps and all the assorted new service offerings from cellular carriers. Also, this portion of the population is more accustomed to traditional handset-based telephone equipment because of their ease of use and familiarity.

In order to serve this market segment, I introduce the innovation of a cellular telephone device that works, looks and feels like a traditional desktop home/office telephone.

This device includes a standard base station with a large number keypad to accommodate consumers with failing eyesight. Furthermore, it has a traditional handset that can rest comfortably in the hand or perched on the shoulder during use. The handset can come in either wireless or traditional wired designs to accommodate the widest number of users. The handset also permits the use of existing technologies for hearing impaired customers who have difficulty hearing over current cellular phone equipment. This cellular handset will be able to make and receive telephone calls in the traditional manner by connecting directly to a cellular service provider.

By connecting directly to a cellular service provider, I offer the comfort of a traditional handset with the flexibility and power of modern internet communications. This eliminates the need for costly telephone cabling in the premises, reduces monthly recurring fees by consolidating telephony services and creates a technology platform for the development of future services.

Furthermore, the direction of recent innovations towards wide-area wireless WiFi will permit direct connection of the cellular handset into up-and-coming WiFi networks broadcasting on spectrum whitespace. The FCC has unanimously approved on Sep. 23, 2010 new rules for permitting the development of frequency hopping WiFi technology with substantially expanded range compared to current offerings.

This is the first significant step towards developing a national wireless cloud for internet services in the United States. This product is perfectly positioned to benefit from this revolutionary technology.

By including a cellular high gain antenna, a circuit board and all the necessary chips of a cellular phone inside a traditional telephone handset, this product can serve consumers who enjoy the comfort of familiar telephone technology but wish to reduce their monthly recurring costs of duplicate services and avoid delays of installation when ordering new traditional wired service or when relocating.

This invention of an office/home telephone equipment that would operate as a regular wireless phone can be manufactured in different models as a regular, traditional and familiar home or office telephone apparatus for the purpose of decoration and handiness such as a desk, wall telephone, etc.

Thus the scope of the portrayal should be determined by the operational description of the invention and their legal equivalents and not only by the examples that I have given.

DRAWINGS

Title: Cellular Phone in a Body of a Home/Office Telephone

I have included four drawings:

FIG. 1 is an abstract sketch of telephone system. An outside view of the device (above) and the telephone Block Diagram (below) constructed in accordance with the invention FIG. 2 a prospective view from outside/top of the telephone constructed in accordance with the invention FIG. 3 an inside/back view of the telephone constructed in accordance with the invention FIG. 4 a detailed view of the block diagram constructed in accordance with the invention

DETAILED DESCRIPTION OF DRAWINGS

FIG. 1 is an abstract sketch of System. An outside view of the device (above) and the telephone Block Diagram (below) The CDMA & GSM auxiliary phone antenna 10, the exterior mounted auxiliary satellite antenna 12, the satellite auxiliary ports 14, the USB ports 16, the phone keyboard 18, the lead display 20, and the handset 22.

Figure 2:
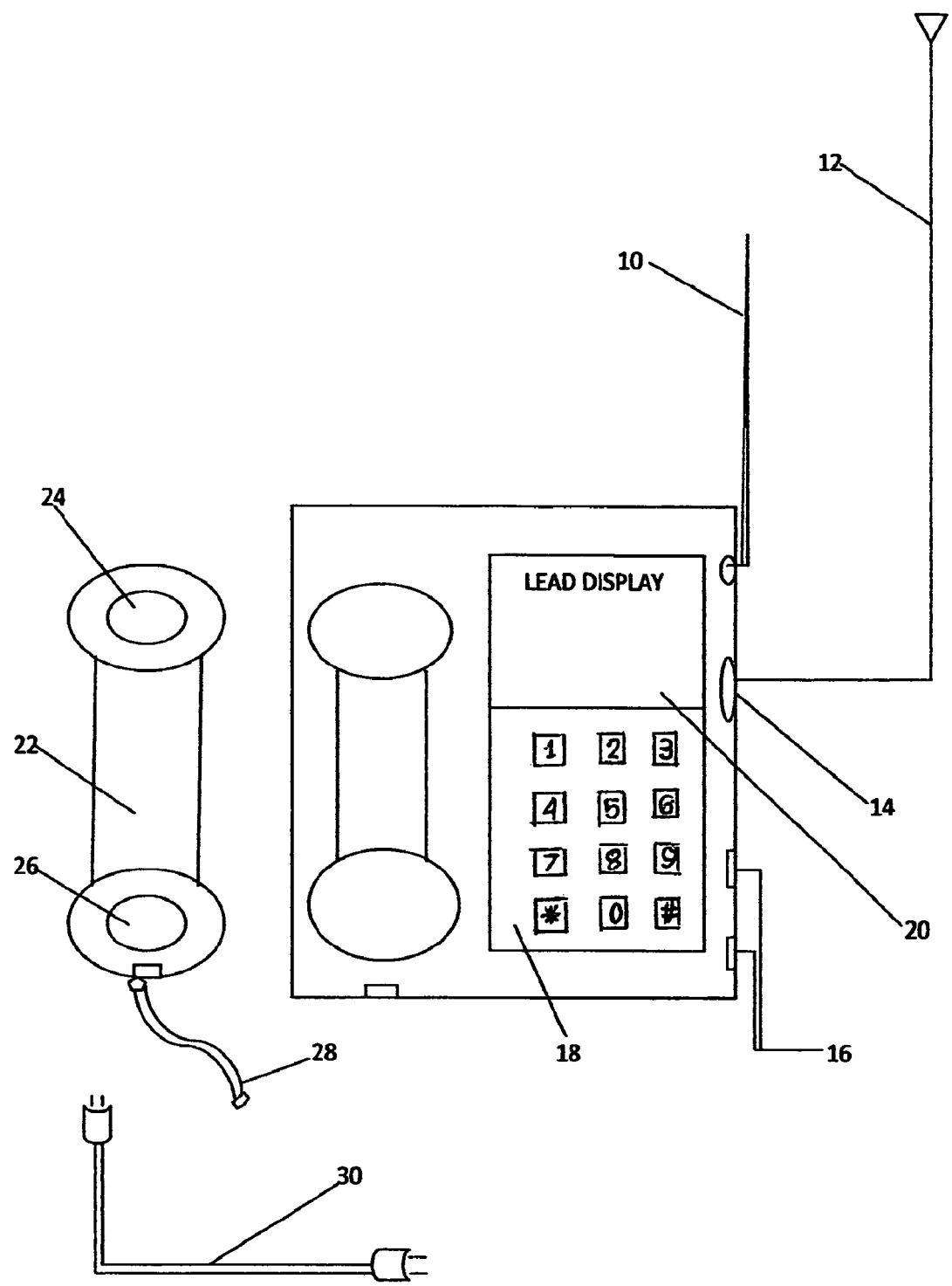

FIG. 2 is a prospective view from outside/top of the telephone constructed according with the invention. The CDMA & GSM auxiliary phone antenna 10, the exterior mounted auxiliary satellite antenna 12, the satellite auxiliary ports 14, the USB ports 16, the phone keyboard 18, the lead display 20, the handset 22, the headset 24, the microphone 26, the handset connector 28, the electric cord 30.

Figure 3:
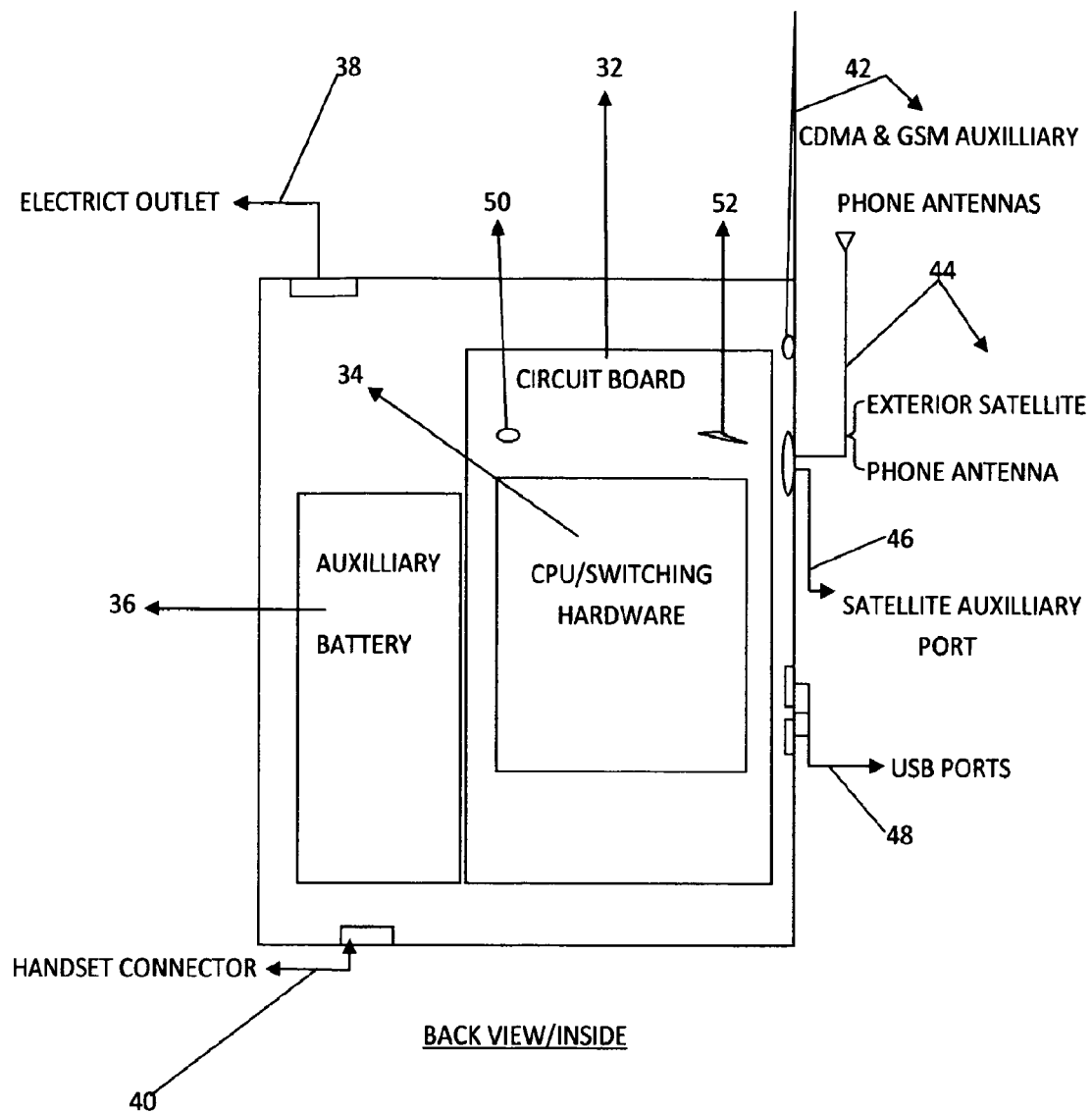

FIG. 3 is an inside/back view of the telephone constructed according with the invention. The circuit board 32, the CPU/switching Hardware 34, the auxiliary battery 36, the electric outlet 38, the handset connector 40, the CDMA & GSM auxiliary antenna 42, the exterior mounted auxiliary satellite antenna 44, the satellite auxiliary port 46, the USB ports 48, the internet router 50, and the WiFi internet hotspot antenna 52.

Figure 4:
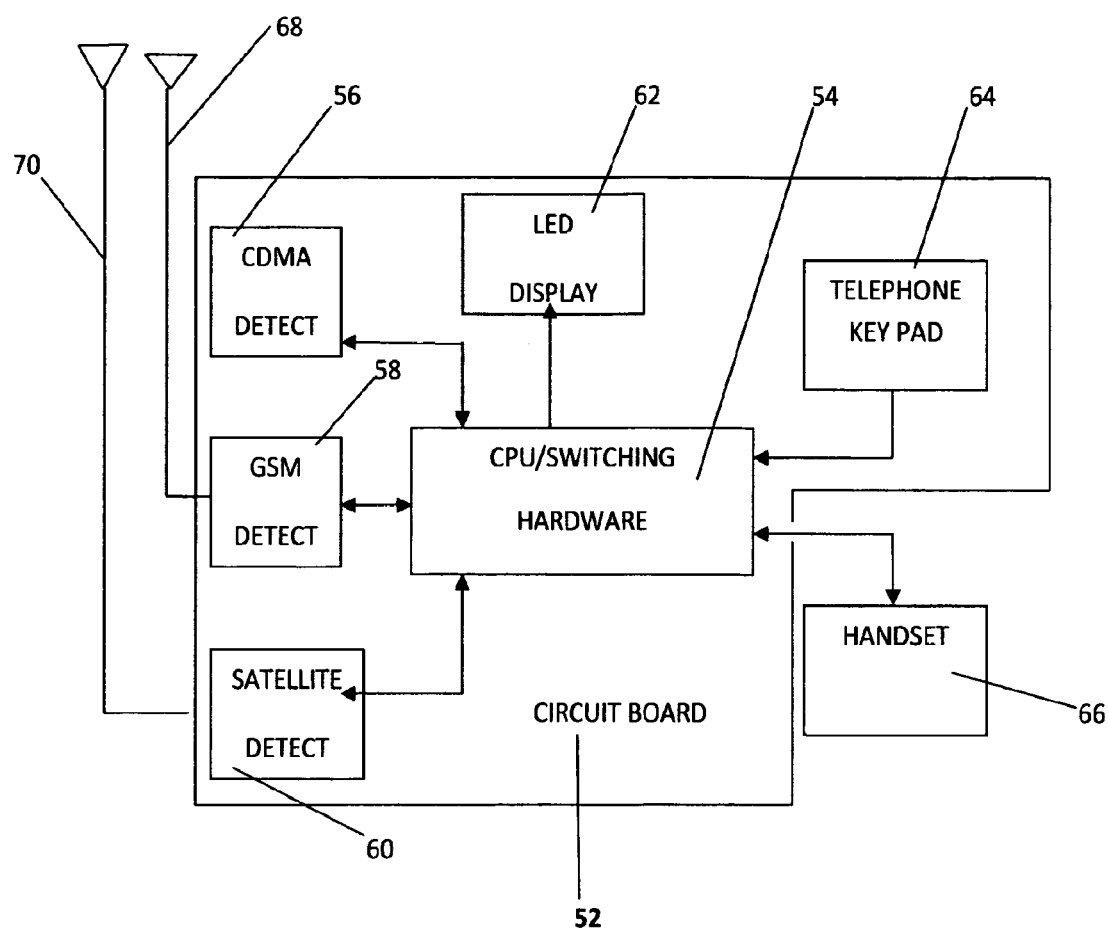

FIG. 4 is a detailed view of the block diagram and its interrelated system of operation constructed according with the invention. The Circuit Board including all necessary computer chips 52, the CPU/Switching Hardware 54, the CDMA Detect 56, The GSM Detect 58, The Satellite Detect 60, the LED Display 62, the telephone Keypad 64, the Handset 66, the auxiliary high gain phone antenna 68, and the exterior mounted auxiliary satellite antenna 70.

Drawing

FIG. 1

FIG. 1. Is an abstract sketch of the invented Telephone System that shows: An outside view of the device (above) and the telephone Block Diagram (below). FIGS. 2, 3 and 4 will show a detailed description of the telephone station from different views.

REFERENCE NUMERALS

Above:
10. The CDMA & GSM auxiliary phone antenna
12. The exterior mounted auxiliary satellite phone antenna
14. The satellite phone auxiliary port
16. The USB ports
18. The Keyboard
20. The Led display
22. The handset
Below:
The Block Diagram Drawing

FIG. 2

FIG. 2. Prospective view from outside/top of the telephone

REFERENCE NUMERALS

10. The CDMA & GSM auxiliary phone antenna
12. The exterior mounted auxiliary satellite phone antenna
14. The satellite phone auxiliary ports
16. The USB ports
18. The Keyboard
20. The Led Display
22. The handset 24. The headset
26. The microphone
28. The handset connector, and
30. The electric cord Drawing

FIG. 3

FIG. 2 is an inside/back view of the telephone

REFERENCE NUMERALS

32. The Circuit Board
34. The CPU/Switching Hardware
36. The auxiliary battery
38. The Electric outlet
40. The Handset connector
42. CDMA & GSM auxiliary antenna
44. The exterior mounted auxiliary satellite antenna
46. The satellite auxiliary port
48. The USB ports, and
50. Internet router
52. WiFi wireless internet hotspot antenna Drawing

FIG. 4

FIG. 4 is detailed view of the block diagram:

REFERENCE NUMERALS

52. The Circuit Board with all necessary computer chips
54. The CPU/Switching Hardware
56. The CDMA Detect
58. The GSM Detect
60. The Satellite Detect
62. The Led Display
64. The Telephone Keypad and,
66. The Handset
68. The auxiliary high gain phone antenna
70. The exterior mounted auxiliary satellite antenna

What is claim is:

1. A self-contained cellular phone, characterized in that the cellular phone is designed for placement and use in a work or home environment and is in a body of a home/office telephone, and transmits and receives voice and data over a plurality of communication bands only through a cellular network and satellite communication system, and the cellular phone comprising:
   a hand set;
   a CDMA (code division multiple access) communication detecting circuit;
   a GSM (global system for mobile communication) communication detecting circuit;
   a direct link satellite communication detecting circuit;
   a CPU (central processing unit)/switching hardware detecting circuit comprising a CPU and a switching device; and a plurality of auxiliary antennas comprising a CDMA and GSMA high gain antenna and an exterior mounted auxiliary satellite antenna;
   wherein the hand set is the main channel of voice transmission; and
   wherein the CPU/switching hardware circuit is a multi-channel device interfacing with the CDMA communication detecting circuit, the GSM communication detecting circuit, and the direct link satellite communication detecting circuit to detect existing CDMA communication, GSM communication, and direct link satellite communication protocols in use and connecting the cellular phone to any of three communication systems corresponding to the existing CDMA communication, GSM communication, and direct link satellite communication protocols; and in addition to detecting different type of signals corresponding to the existing CDMA communication, GSM communication, and direct link satellite communication protocols, through the use of the plurality of auxiliary antennas, the switching device is configured to automatically select a communication channel appropriate for a coverage area from three communication channels corresponding to the existing CDMA communication, GSM communication, and direct link satellite communication protocols respectively and then open the selected communication channel through an appropriate carrier.

2. The self-contained cellular phone according to claim 1, further comprising a WiFi communication circuit and a WiFi wireless internet hotspot antenna.

3. The self-contained cellular phone according to claim 1, further comprising one or more USB ports through which the cellular phone can be used as a full computer by installing exterior keyboards, screens and any other computing device for additional communications.

4. The self-contained cellular phone according to claim 3, wherein the additional communications are text and e-mail messages.

5. The self-contained cellular phone according to claim 1, further comprising a router and the CPU/Switching hardware circuit functioning as a standard base station with a large number keypad.

6. The self-contained cellular phone according to claim 1, wherein the hand set is either wireless type or wired type.

7. The self-contained cellular phone according to claim 1, further comprising a battery back-up power unit by which the handset can be powered during power failure conditions.

8. The self-contained cellular phone according to claim 1, wherein the CDMA communication detecting circuit further detecting an LTE CDMA communication.

9. The self-contained cellular phone according to claim 1, further comprising a LED display.

10. The self-contained cellular phone according to claim 1, further comprising one or more satellite auxiliary ports and/or one or more handset connectors.

* * * * *